Figure 2:
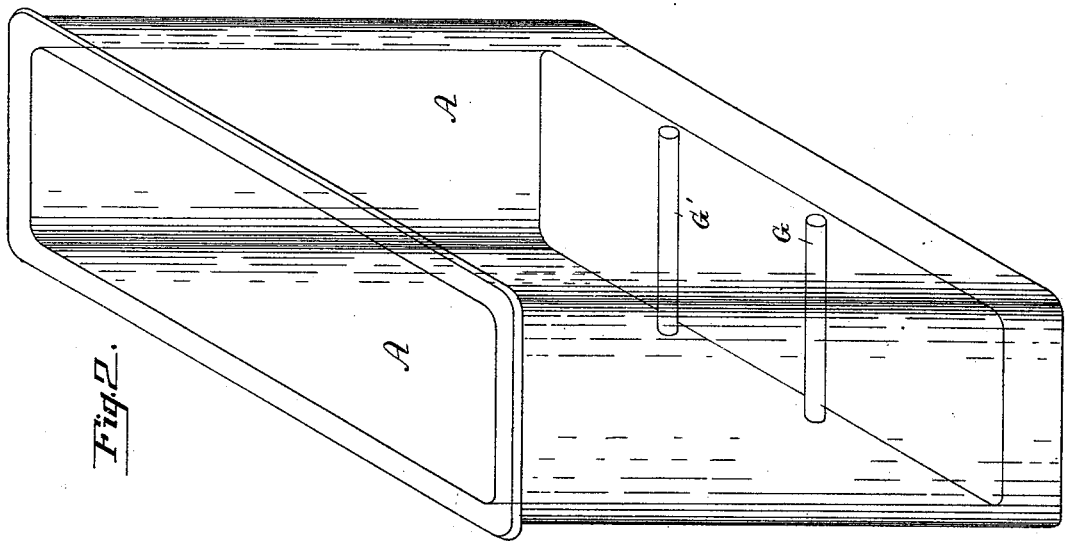

(No Model.) 2 Sheets—Sheet 1.

C. PAYEN.
ELECTRODE FOR SECONDARY BATTERIES.

No. 415,329. Patented Nov. 19, 1889.

WITNESSES:
Hermann Bormann.
Thomas M. Smith.

INVENTOR:
Clement Payen.
By J. Walter Douglass.
Atty.

(No Model.) 2 Sheets—Sheet 2.
C. PAYEN.
ELECTRODE FOR SECONDARY BATTERIES.
No. 415,329. Patented Nov. 19, 1889.
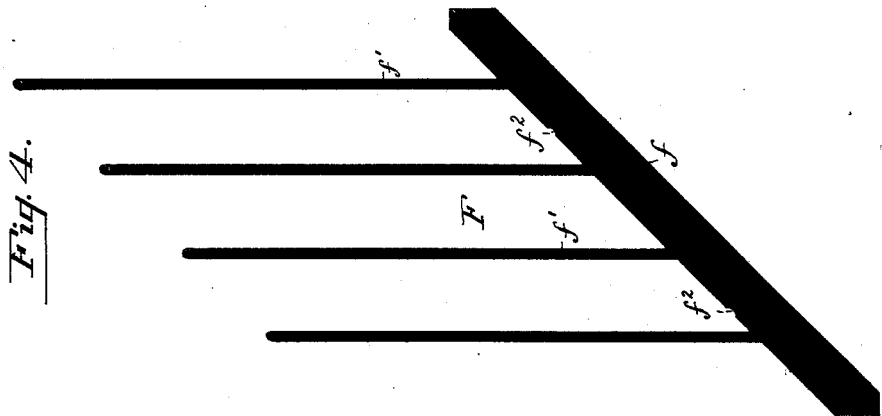
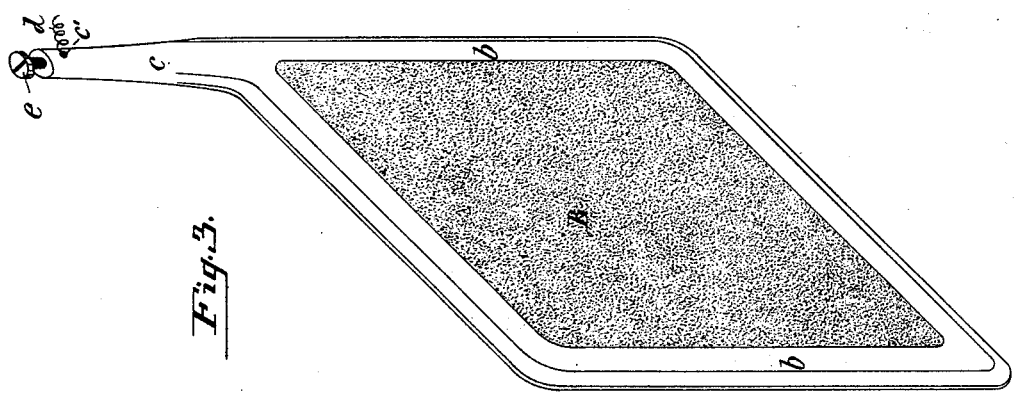

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

ELECTRODE FOR SECONDARY BATTERIES.

SPECIFICATION forming part of Letters Patent No. 415,329, dated November 19, 1889.

Application filed February 13, 1888. Serial No. 263,861. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in Secondary or Storage Batteries, of which the following is a specification.

My invention relates in general to what is commonly termed a "secondary" or "storage" battery, and especially to the preparation of plates to constitute the elements or electrodes thereof.

Heretofore the elements of secondary or storage batteries have been known under two general heads: first, the method of Faure, in which the active material or material to become active as a paste or in granular form has been applied mechanically to a supporting-frame, and, second, the method of Planté, in which the active material has been rendered porous and formed by electro-chemical action.

My invention relates more particularly to the latter type of battery, and the principal object is to provide a crystallized metal plate or element which, when ready for formation, is composed of acicular or needle-like crystals disposed side by side, or approximately so, within and throughout the structure, but separated from one another by cells. The said crystals extend from the sides or faces of the plate or other structure to or beyond a median line thereof, where the crystals become interlaced with each other. The general disposition or arrangement of the acicular crystals in the plate or other structure is at or substantially at right angles to the principal plane thereof. In the separation of the acicular crystals of the plate by cells the plate is rendered highly porous, so that the enlargement of the metallic crystals by their absorption of oxygen in the formation of oxide obviates buckling and warping of the plates or elements, and, moreover, when provided with supporting-frames obviating bursting thereof, due to the fact that space enough is presented within the body of the plates or other structures to permit of expansion. The respective crystals expose their surfaces to the action of oxygen in such a manner as to afford an easy exit for the latter, and by the reduction of the oxide, due to the discharge of the battery, the crystals are contracted, thereby again leaving the cells in proper condition for recharging the battery.

My invention consists in fusing with a metallic salt a metal or metals or a salt or salts of such metal or metals or mixtures or combinations in variable proportions of two or more of them, then discharging the mass into a mold or other vessel to cause the crystals composing said mass in cooling rapidly or otherwise to assume a solid crystallized form in a structure, and then reducing the plate or other structure to a metallic state, and by the operation driving out matter foreign to the particular method required, whereby after washing will be produced a porous crystallized metal plate having substantial strength and especially adapted for use as an element of a secondary or storage battery.

My invention further consists in providing a secondary or storage battery in which cracking, peeling, and warping of the plates or elements are obviated, and the battery thereby rendered much more efficient, owing to the large percentage of active matter or material offered for accumulating the energy of the charging-current, and the intensity of the electric charge and discharge increased without affecting the strength of the plates or elements thereof.

The principal characteristic features of my invention having been pointed out, I will now proceed to describe the method of constructing a porous crystallized metal lead plate or element.

I take for the base a charge of chloride of lead, ($PbCl_2$,) and to which I add a suitable amount or percentage of chloride of cadmium or of chloride of zinc or of metallic zinc. The said chloride or chlorides or metal, or either or both, may be added before or during the fusion of the mass in any preferred manner; but I, however, prefer to add the chloride of cadmium or chloride of zinc or metal zinc, or either or both, gradually during the fusing of the chloride of lead. The proportion of chloride of cadmium and chloride of zinc or of metal zinc to the charge of chloride of lead will in each case depend upon the degree of porosity and strength required in the plate or element. I have obtained, also, good results by the substitution of other metallic salts in combination with the chloride of lead in the production of a porous crystallized metal plate. The simple addition of cadmium to a charge of chloride of lead enables a crystallized plate to be obtained which is not hygroscopic, and this is a very necessary condition, especially when it is desired to form a frame around the same to adapt it for use as an element of a secondary battery.

While I have described a particular metallic salt for illustrating my invention, still I do not wish to be understood as limiting myself to the use of such salt with the salts of other metal or a metal or metals to obtain as a product a porous crystallized metal plate, because my invention comprehends the fusing with the salt of a metal one or more other metallic salts or a metal or metals or one or more metallic salts and a metal or metals, and then causing the mass to become crystallized in the cooling of the same, and subsequently reducing the cast structure to a metallic state by electrolysis or chemical action, or both, and with foreign matter not forming a component part of the metal required eliminated therefrom during the process of reduction or eliminated by fusion, volatilization, or sublimation, whereby after washing in any suitable manner the product arrives at a porous crystallized metallic state.

The crystallization of the fused mass composed of chloride of lead and chloride of zinc or metallic zinc or chloride of cadmium, or both chlorides, may be carried out in a mold. The mold to which preference is given is one made of either brass or bronze and composed of two symmetrical sides or sections of either equal or unequal thicknesses of metal.

When a fused mass is poured into a two-part mold of equal thicknesses of metal, the mass will commence to cool from each side, and the crystals composing the same will meet or unite with each other at their summits, sides, or facets, forming columns throughout the mass, and the columns of crystals thus formed from the respective sides of the mold meet or unite at the median line of the plate or other structure. On the other hand, if the parts of the mold are of unequal thicknesses of metal, the crystals of the mass will commence to cool therein from the side having the greater thickness of metal, and will meet the mass forming in columns from the opposite side of the mold beyond the median line of the plate or other structure.

While preference is given to a mold having the two sides of equal thicknesses of metal for causing the mass or compound in cooling therein to assume a crystallized acicular form from the sides or faces of the structure to a median line thereof, where they interlace with each other, still I do not wish to confine myself to such type of mold, as a good plate may be obtained in a mold in which the sides are of unequal thicknesses of metal. The plate, having assumed a crystallized form, may then be placed in another mold and lead or other material or materials cast around the crystallized plate in any preferred manner. A series of the above-mentioned chloride plates may then be reduced to a metallic state by electrolysis or chemical action, or both, or after reduction of such plates by a single electrolysis the matter foreign to the metal required may be eliminated by fusion, volatilization, or sublimation, producing thereby porous crystallized metal plates of substantial strength. When electrolysis is resorted to for the reduction of the chloride plates to a metallic state, they are immersed in an electrolytic bath arranged as cathodes therein in the ordinary and well-understood manner.

Having thus explained the method of constructing a porous crystallized metal lead plate to form an element of a secondary battery according to my invention, I will now refer to the accompanying drawings, wherein I have illustrated my invention in a form found practically efficient, and in which—

Figure 1:
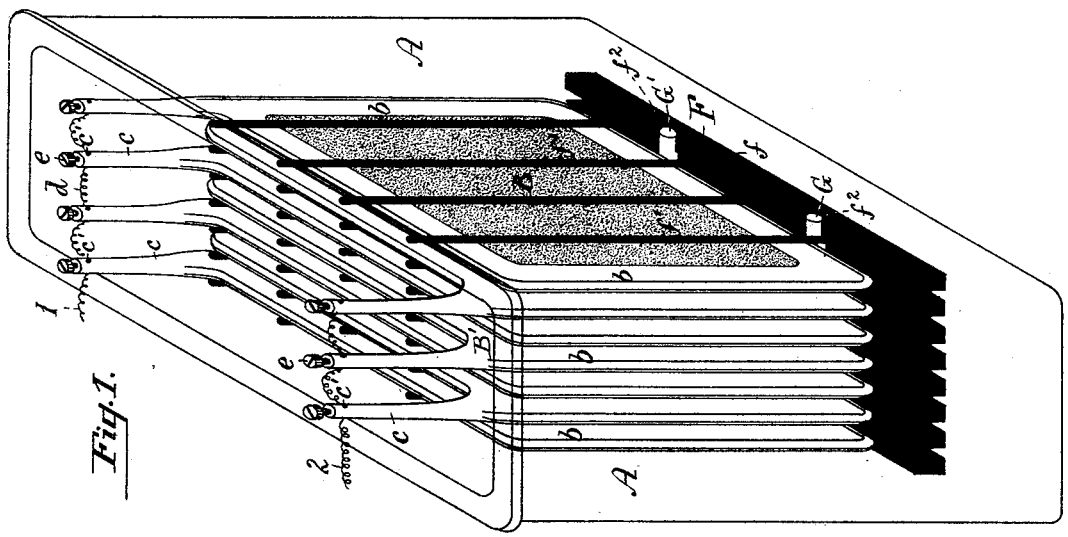

Figure 1 is a perspective view of a cell with two systems of porous crystallized metallic plates insulated from one another and from the cell, and said view showing my improved electrical accumulator in a form ready to receive electrical energy for use. Fig. 2 is a perspective view of a form of cell for mounting the systems of crystallized plates or elements in for the storage of electrical energy. Fig. 3 is a similar view of one of the crystallized porous metallic plates made according to my invention and provided with a frame having a conductor, and Fig. 4 is a perspective view of an insulating device used in connection with the crystallized plates as an electrical accumulator.

Referring to the drawings, A is a cell of glass or other suitable material.

B is a crystallized porous metallic plate, having a frame $b$ cast around the same and formed preferably integral therewith. At one of the corners of the same is a conductor $c$, with an eye $c'$ for the reception of a wire $d$. This wire is held in position therein by means of a set-screw $e$.

F is an insulating device of rubber or other preferred material, consisting of a rectangular-shaped bar $f$, having a series of vertical rods $f'$.

G and G' are glass insulators resting in recesses $f^2$, formed in each of the horizontal bars $f$ of the insulating devices F.

The two systems of porous crystallized metal plates or elements B and B', hereinbefore described, are mounted in the cell A, containing a fluid, insulated from each other and the cell, and the current is passed through said plates or anodes and cathodes by means of wires 1 and 2, connected, respectively, with the positive and negative poles or electrodes of a dynamo, whereby electrical energy may be readily stored up in the said plates or elements for use.

Expansion of the plates or elements mounted in battery, which always occurs in all batteries, will take place in mine vertically instead of laterally, whereby the respective plates or elements thereof will be preserved intact without flaw, crack, or breakage. If lateral expansion was permitted, fissures or cracks would be formed in the plates and result in a short time in their total destruction.

Conductibility, which is desirable in the highest degree both in the electrical charge and discharge, is attained in a maximum degree in the use of plates made according to my invention, due to the metallic contact subsisting between the atoms of the plates. The electrical capacity of the plates and their rate of discharge are higher than in those heretofore used, owing to their porosity and general construction. Moreover, the charging of the battery is effected in much less time and the discharge accomplished with greater facility and without fear of disintegration.

The crystallized metal plates or elements, instead of being provided with a supporting-frame, may have a conductor of platinum wire or other material inserted directly into them, and the plates or elements used quite as effectually mounted in battery. Owing to the strength of the plates, their life and capacity for use are much prolonged beyond those as heretofore made for such purposes.

While I have described the porous crystallized metal plates in their special application to form the plates or elements of a secondary battery, still I do not wish to be understood as limiting myself to their use only in such type of battery, as they are equally applicable to other kinds of electric batteries.

Having thus described the nature and objects of my invention, what I claim as new, and desire to secure by Letters Patent, is—

1. A battery element consisting of a porous crystallized plate composed of active material, substantially as described.

2. A battery element consisting of a porous metal plate having the crystals existing in columns therein, substantially as described.

3. A battery element consisting of a metal plate having the crystals existing in acicular form, with cells between them, and the plate provided with a supporting-frame, substantially as and for the purposes set forth.

4. A battery element consisting of a metal plate having the crystals existing in columns therein, and cells between them, and the plate provided with a frame having a lug, substantially as and for the purposes set forth.

5. An electric battery composed of two systems of porous crystallized metal plates mounted in a cell containing a fluid, and said plates held firmly in position therein insulated from each other and the cell, substantially as described.

In witness whereof I have hereunto set my hand in the presence of two subscribing witnesses.

CLÉMENT PAYEN.

Witnesses:
HERMANN BARRMANN,
CHAS. HART.